Jan. 2, 1940.  E. A. SENECAL  2,185,926
VIEWING ATTACHMENT FOR MICROSCOPES
Filed June 18, 1938  3 Sheets-Sheet 1
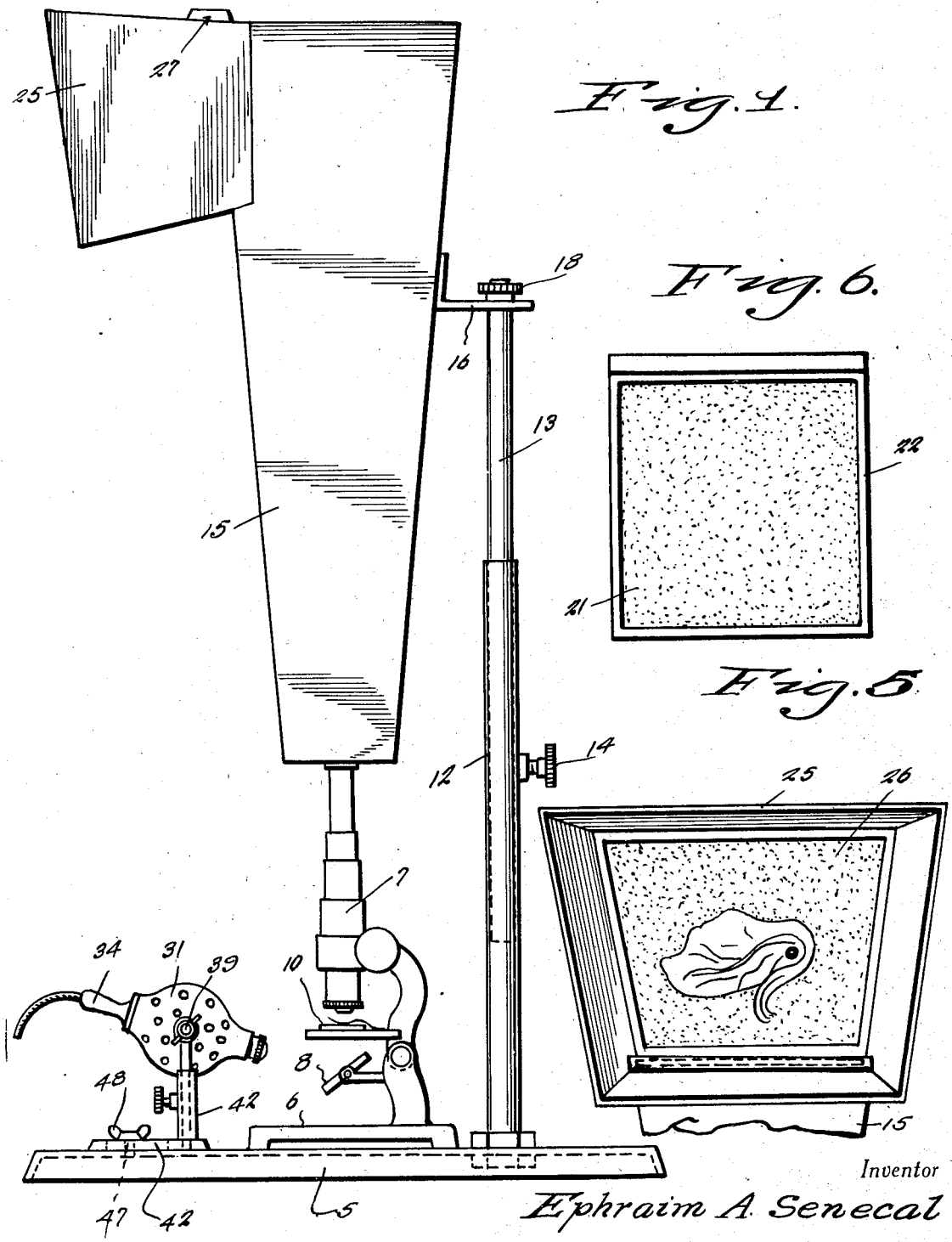
Inventor
*Ephraim A. Senecal*
By *Clarence A. O'Brien*
*Hyman Berman*
Attorneys

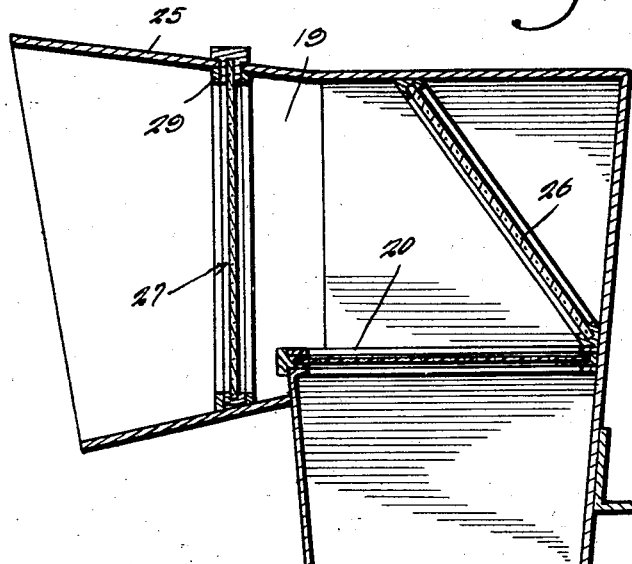
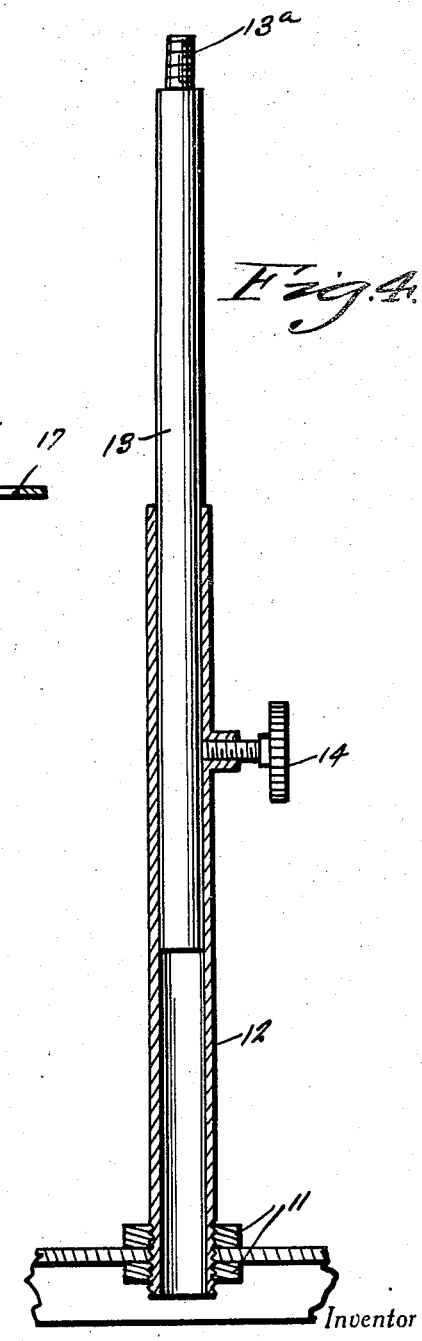
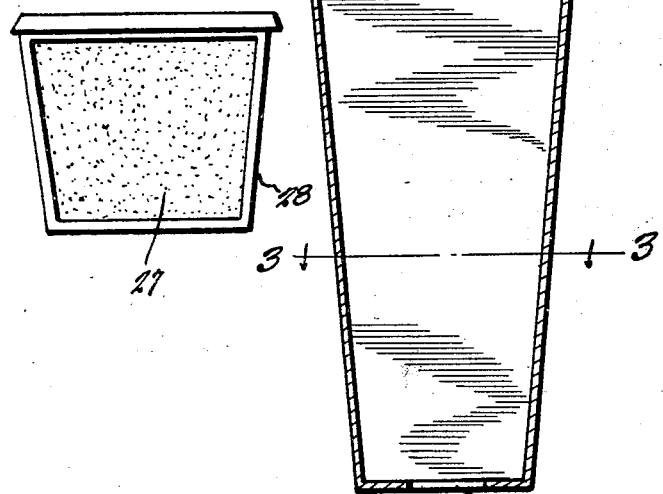
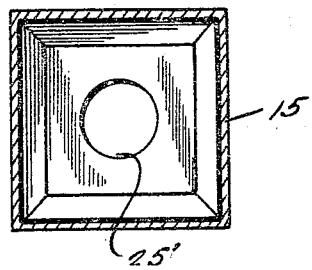

Jan. 2, 1940.  E. A. SENECAL  2,185,926
VIEWING ATTACHMENT FOR MICROSCOPES
Filed June 18, 1938  3 Sheets-Sheet 3
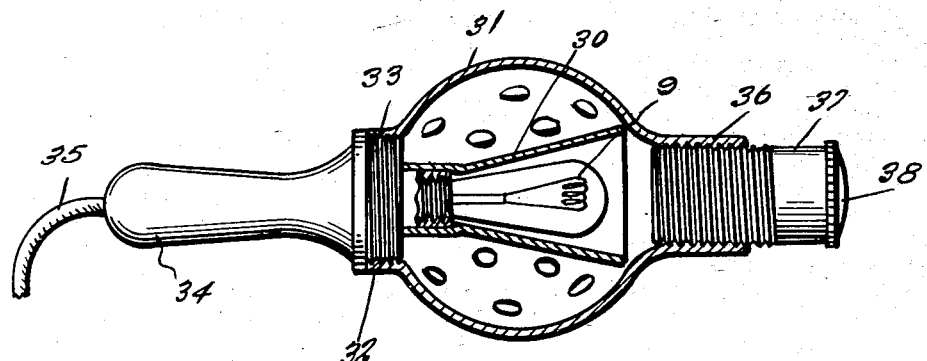
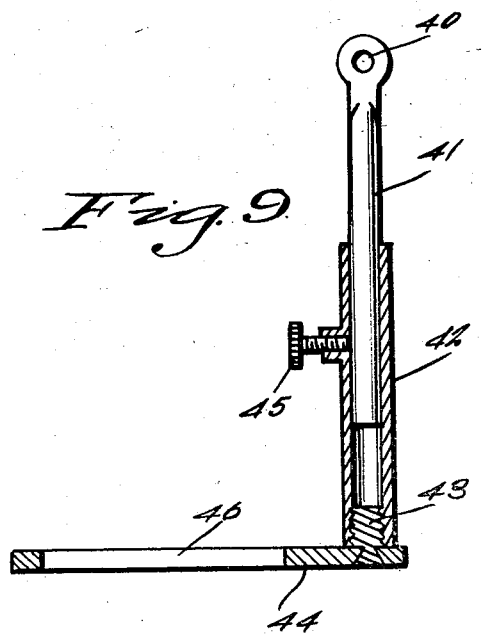
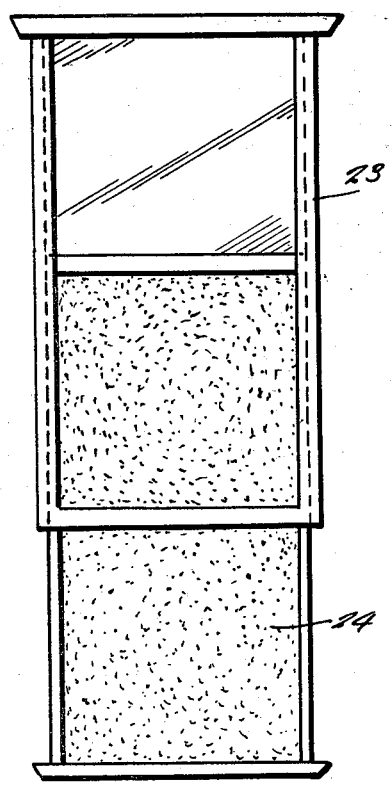
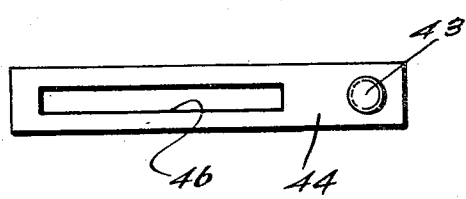
Inventor
Ephraim A. Senecal
By Clarence A. O'Brien
Hyman Berman
Attorneys Patented Jan. 2, 1940

2,185,926

UNITED STATES PATENT OFFICE 2,185,926

VIEWING ATTACHMENT FOR MICROSCOPES

Ephraim A. Senecal, St. Albans, Vt., assignor of twenty-five per cent to Frances D. Twigg, Rutland, Vt.; M. H. Alexander, administrator of said Ephraim A. Senecal, deceased Application June 18, 1938, Serial No. 214,544

1 Claim. (Cl. 88—24)

This invention is what I call a viewing attachment for microscope and is in the nature of a device to be used in conjunction with any suitable type of microscope for viewing, in a lighted room, the object placed under the microscope for examination, and also for photographing, if desired, such object while the same is in a magnified state; and the invention together with its objects and advantages will be best understood from a study of the following description taken in connection with the accompanying drawings wherein:

Figure 1 is a side elevational view illustrating the invention,

Figure 2 is a longitudinal sectional view of a casing and associated parts,

Figure 3 is a horizontal sectional view through the casing taken substantially on the line 3—3 of Figure 2, Figure 4 is a fragmentary view of a stand and a casing-supporting post, certain parts being shown in section, with other parts being shown in elevation, Figure 5 is a front elevational view at the upper hood-equipped end of the casing, Figure 6 is a plan view of a framed ground or frosted glass, Figure 7 is an elevational view of a photo plate and screen therefor, Figure 8 is a projector bulb assembly, Figure 9 is a view of a base plate and supporting post for the projector-bulb assembly, certain parts being shown in section and other parts in elevation, Figure 10 is a top plan view of the assembly shown in Figure 9, but with the supporting part omitted, and Figure 11 is an elevational view of a screen.

Referring to the drawings by reference numerals it will be seen that 5 indicates a suitable base. Resting on the base 5 intermediate opposite ends of the base is the base 6 of any suitable type of microscope indicated generally by the reference numeral 7. Microscope 7 is also provided as usual with a lower orientable mirror 8 so that the illuminating light from the bulb 9, hereinafter more fully referred to, may be reflected to pass upwardly through the object slide 10 and thence through the microscope to produce upon either a ground glass screen, hereinafter more fully referred to, or a photographic plate an enlarged projected optical image of the object to be examined or photographed.

Further in accordance with the present invention, the base 5 has secured thereto, through the medium of nuts 11 in a manner clearly shown in Figure 4, or in any other suitable manner, the lower end of a tubular post section 12. Slidably fitting in the post section 12 is a post section 13 that is held at the desired position of adjustment through the medium of a screw 14 as will be clear from a study of Figure 4.

The post composed of the sections 12 and 13 supports at the desired position of vertical adjustment a casing 15.

The casing 15 is in the form of a substantially funnel-shaped hollow body having its sides converging towards its lower ends and is made of wood, metal, or other suitable material. In actual practice, if desired, the casing 15 may have an exterior covering of leather or other suitable material.

Secured suitably to one of the sides of the casing is an attaching bracket plate 16 that has a portion extending from said side of the casing and apertured as at 17 to receive a threaded reduced upper terminal 13a of the post section 13. Said apertured portion of the attaching bracket 16 is secured to said end 13a of the post section 13 through the medium of a nut 18.

One of the sides of the casing 15 at the upper end of the casing is provided with an opening 19 and at the base of said opening the casing 15, interiorly, is provided with a substantially continuous screen-supporting frame 20. Frame 20 is adapted to slidably accommodate either a ground glass 21 mounted within a suitable frame 22, or a photographic plate 23. Manifestly, the plate 21 is used when it is merely desired to examine the specimen, while the photographic plate 23 is used when it is desired to make a photograph of the magnified specimen. Photographic plate 23 is provided with a slide screen 24 so that a selected portion of the plate may be exposed as desired.

In connection with the above it will be noted that at the bottom thereof the casing 15 is provided with an opening 25' that aligns with the upper end of the microscope 7. Thus it will be seen that the bulb 9 will direct a concentrated intense light upon the reflecting mirror 8 of the microscope so that the illuminating light may be passed upwardly through the object slide 10, and then through the microscope and the casing 15 to produce upon the frosted glass-screen 21, or the photographic plate 23, as the case may be, an enlarged projected optical image of the object to be examined.

The casing 15 has projecting from the upper end thereof at the side equipped with the opening 19 a hood 25 the sides of which converge towards the opening 19. The hood 25 will serve to keep out the light thus permitting use of the device in a lighted room.

Also, that the enlarged projected optical image of the object being examined, and as produced upon the screen 21 may be the more easily viewed, there is suitably mounted within the upper end of the casing 15, and above the frame 20, a reflecting mirror 26. Thus, one by looking into the mirror 26 will obtain, without undue strain on the eyes, a complete view of the enlarged optical image produced upon the screen 21.

When the photographic plate 23 is used for the purpose of taking a photograph of the magnified image of the object to be examined, recourse is had to a light-excluding screen 27.

The screen 27 is formed of any suitable dark light-excluding material mounted within a frame 28. Screen 27, mounted within the frame 28, is accommodated within the hood 25 through the medium of a suitable retaining frame 29 provided therefor in the hood. At the top thereof the hood, in alignment with the top of the frame 29, is provided with a slot to facilitate insertion and removal of the light-excluding slide 27.

Also in accordance with the present invention the light source, namely the bulb 9, is mounted within a suitable reflector 30 that in turn is suitably and removably mounted within a substantially spherical perforated casing 31. In this connection it will be seen that the reflector 30 is provided at one end thereof with a diametrically enlarged threaded base portion 32 that threads within a substantially cylindrical neck 33 formed integral with the casing 31. The base 32 of the reflector is formed integral with a handle 34 that has a suitable bore therethrough to accommodate the light extension cord 35.

Diametrically opposite to the neck 33, casing 32 is provided with a tubular internally threaded neck 36 into which threads a tubular lens casing 37. Mounted in the lens casing 37 is the spot lens 38 as shown.

Casing 30 also has extending from one side thereof a threaded stud 39 that is accommodated within an eye 40 provided on the upper end of a supporting rod or post section 41. Post section 41 has a sliding fit in a tubular post section 42 that at its lower end is threaded onto a stud 43 rising from a base plate 44. Post section 41 is secured at the desired position of vertical adjustment through the medium of a screw 45.

The base plate 4 rests on the aforementioned base 5 and is provided with an elongated slot 46 to accommodate a threaded stud 47 rising from the base 5. Threaded on the upper end of the stud 47 is a thumb nut 48 that is adapted to be threaded home into binding engagement with the base plate 44 for securing the latter at the desired position of adjustment on the base 5 relative to the base 6 of the microscope.

From the above it will be seen that the light source may be adjusted toward or away from the microscope as found desirable; and that also by swinging the casing 31 vertically the bulb 9 may be placed at the desired position of angular adjustment.

It will thus be seen that with my device, one may, without undue eye strain, readily view and examine the magnified specimen placed under the microscope; and also a photograph of the specimen so magnified may be readily made in order to provide a permanent photographic record thereof.

It is thought that a clear understanding of the construction, manner of using, utility and advantages of an invention embodying the features of the present invention will be had without a more detailed description.

Having thus described the invention what is claimed as new is:

In a device of the class described, a base, a microscope supported on the base, a standard rising from the base, means for adjusting the length of the standard, a vertically arranged viewing casing attached to the top of the standard and provided at its lower end with an opening substantially aligning with the microscope, said casing at one side thereof adjacent the top having an opening therein, a substantially horizontally arranged hood extending from the said side of the casing and enclosing the opening, said hood having its top substantially flush with the top of the casing and its bottom wall spaced below the bottom wall of the opening, horizontally arranged guiding means extending across the casing, in a plane adjacent the lower wall of the opening, an element carrying slide engaging said guiding means with one end projecting from the lower wall of the opening in said side of the casing, said slide adapted to receive either a screen or a photographic plate, a reflecting mirror diagonally arranged in the upper end of the casing for reflecting an image on the screen through the hood, said hood having a slot in its top and guiding means in the hood for receiving an element-carrying slide passed through said slot.

EPHRAIM A. SENECAL.